(12) United States Patent
Paulissen et al.

(10) Patent No.: US 12,177,104 B2
(45) Date of Patent: Dec. 24, 2024

(54) METHOD FOR ESTIMATING BANDWIDTH BETWEEN A VIDEO SERVER AND A VIDEO CLIENT

(71) Applicant: THEO TECHNOLOGIES, Leuven (BE)

(72) Inventors: Lieven Paulissen, Wilsele (BE); Pieter-Jan Speelmans, Diest (BE)

(73) Assignee: THEO TECHNOLOGIES, Leuven (BE)

( * ) Notice: Subject to any disclaimer, the term of this patent is extended or adjusted under 35 U.S.C. 154(b) by 0 days.

(21) Appl. No.: 17/919,993

(22) PCT Filed: Mar. 29, 2021

(86) PCT No.: PCT/EP2021/058095
§ 371 (c)(1),
(2) Date: Oct. 19, 2022

(87) PCT Pub. No.: WO2021/213781
PCT Pub. Date: Oct. 28, 2021

(65) Prior Publication Data
US 2023/0048428 A1 Feb. 16, 2023

(30) Foreign Application Priority Data
Apr. 21, 2020 (EP) .................................... 20170595

(51) Int. Cl.
*H04L 43/0894* (2022.01)
*H04N 21/442* (2011.01)
(Continued)

(52) U.S. Cl.
CPC ... *H04L 43/0894* (2013.01); *H04N 21/44209* (2013.01); *H04N 21/4621* (2013.01); *H04N 21/8456* (2013.01)

(58) Field of Classification Search
CPC .......... H04L 43/0894; H04N 21/44209; H04N 21/4621; H04N 21/8456; H04N 21/44004
See application file for complete search history.

(56) References Cited

U.S. PATENT DOCUMENTS 10,484,730 B1 * 11/2019 Li ..................... H04N 21/44209
10,506,002 B2 * 12/2019 Lou ........................ H04L 65/80
(Continued)

FOREIGN PATENT DOCUMENTS

CN 107809648 A 3/2018
EP 3515075 A1 7/2019

OTHER PUBLICATIONS

Van Der Hooft et al., "A Learning-Based Algorithm for Improved Bandwidth-Awareness of Adaptive Streaming Clients," 2015 IFIP/IEEE International Symposium on Integrated Network Management, May 11, 2015, 8 pages.
(Continued)

*Primary Examiner* — Abdullahi E Salad
(74) *Attorney, Agent, or Firm* — Workman Nydegger

(57) ABSTRACT

A method for estimating bandwidth between a video server and a video client for playing back a video stream includes video packets. The method involves the following steps performed by the video client: receiving the video packets from the video server wherein the video packets are transmitted by the video server at predetermined time intervals; calculating a difference in a size of the video packets and a difference in a time of reception of the video packets; and estimating the bandwidth based on the calculated difference in size and the calculated difference in the time of reception. The present disclosure further relates to a media player configured to perform the disclosed method.

13 Claims, 9 Drawing Sheets

(51) Int. Cl.
H04N 21/462 (2011.01)
H04N 21/845 (2011.01)

(56) References Cited

U.S. PATENT DOCUMENTS

| | | | |
|---|---|---|---|
| 2012/0141089 A1* | 6/2012 | Hunt | H04N 21/2385 |
| | | | 386/239 |
| 2013/0166768 A1 | 6/2013 | Gouache et al. | |
| 2014/0082678 A1* | 3/2014 | Nagai | H04N 21/2182 |
| | | | 725/92 |
| 2014/0089993 A1* | 3/2014 | Huysegems | H04L 65/1069 |
| | | | 725/86 |
| 2014/0136653 A1* | 5/2014 | Luby | H04L 67/06 |
| | | | 709/217 |
| 2014/0156863 A1* | 6/2014 | Gao | H04L 65/60 |
| | | | 709/231 |
| 2014/0269401 A1* | 9/2014 | Gondi | H04L 65/70 |
| | | | 370/253 |
| 2015/0381686 A1 | 12/2015 | Hurst | |
| 2017/0094298 A1* | 3/2017 | Gu | H04N 19/184 |
| 2017/0195235 A1* | 7/2017 | Giles | H04L 47/28 |
| 2018/0270521 A1* | 9/2018 | Lindgren | H04L 47/263 |

OTHER PUBLICATIONS

Search Report from corresponding European Application No. 20170595.1, Jul. 28, 2020.
International Search Report from PCT Application No. PCT/EP2021/058095, May 4, 2021.

* cited by examiner

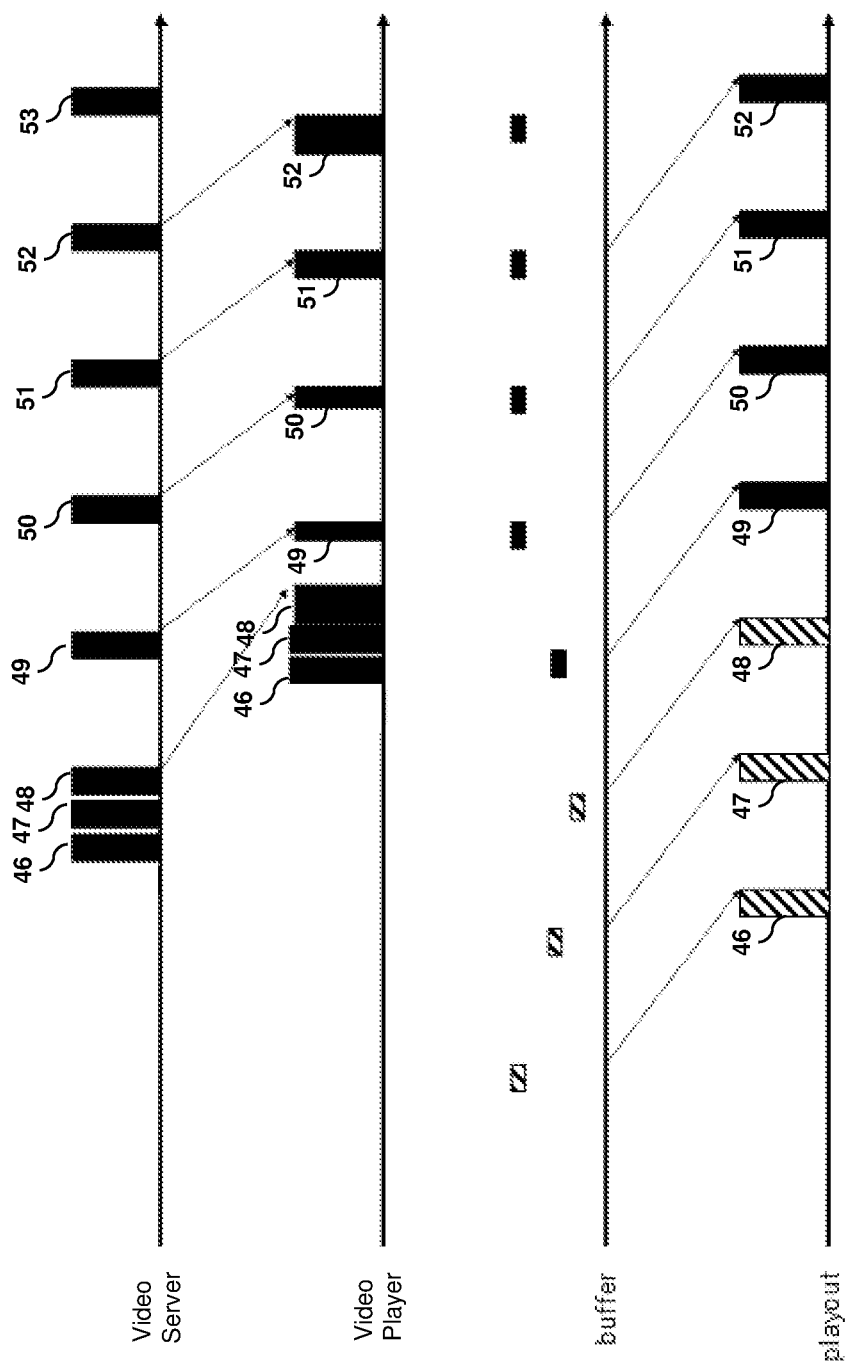

METHOD FOR ESTIMATING BANDWIDTH BETWEEN A VIDEO SERVER AND A VIDEO CLIENT

TECHNICAL FIELD

The present disclosure relates to a method for estimating the bandwidth of a communication network between a video server and a video client.

BACKGROUND

Video streaming from a remote video server over a communication network to a video client, such as a video player running in a browser application on a client device is subject to bandwidth variations. Bandwidth variations lead to a stall or a lag in the playback of the video on the client device. For example, the video playback may stall if the arrival of the video content on the client device is too slow. Likewise, if the available bandwidth is not optimally used, the quality of the displayed video is lower than technically possible.

Adaptive bitrate solutions for streaming video whether live or on demand have been devised in which the video client switches between different bit rates, resolutions or codecs depending on the available bandwidth. To achieve this, versions of the video stream, each with a different bit rate, resolution or codec, are made available on the video server for the client. The different video stream versions may be segmented into segments which may be played independently from one another, thereby allowing the video client to switch between the different versions as needed depending on the available bandwidth. Depending on the adaptive bitrate solution, the available bandwidth between the video server and the video player on the client device is, typically, estimated by, for example, adding artificial bursts in the video stream or by monitoring the state of the buffer of the video player on the client device.

US 2018/0270521 A1 discloses a mechanism for providing adaptive bit rate adjustments of live media streams based on monitoring the rate of change in the received bitrate level at a client device to provide a predicted future bandwidth characteristic of the network based on the change. The received bitrate is measured during a test period and by transmitting short bursts of data as one chunk.

US 2014/0089993 A1 discloses a method for streaming a video content in a fragment transfer mode from a server to a client over a communication network. According to the proposed method, the client device monitors the buffer filling and measures the transfer-time of the requested fragments to decide on the quality level of the next fragment that must be downloaded.

US 2017/0094298 A1 discloses a method for initial bandwidth estimation for real-time video transmission during the process of establishing a call between the video sender and the video receiver. The method involves transmitting an artificial series of video packets and measuring the round-trip-delay between the video sender and the video receiver to determine the available bandwidth.

U.S. Pat. No. 10,484,730 B1 discloses a bandwidth estimation technique when video content is transferred in a chunked transfer mode. The bandwidth estimation is done based on the size of the received video chunk and its duration of delivery which is calculated as the difference in time of reception of the received video chunk and the time of reception of a previously received video chunk.

SUMMARY

It is an object of embodiments of the present disclosure to provide a solution for determining the bandwidth between a video server and a video client in a non-intrusive and accurate manner. It is a further object of embodiments of the present disclosure to provide a solution for determining the bandwidth suitable for ultra-low latency video streams, such as live video streams.

The scope of protection sought for various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by a method for determining bandwidth between a video server and a video client for playing back a video stream comprising video packets, the method comprising the following steps performed by the video client:

receiving the video packets from the video server wherein the video packets are transmitted by the video server at predetermined time intervals;

calculating a difference in a size of the video packets and a difference in a time of reception of the video packets; and determining the bandwidth based on the calculated difference in size and the calculated difference in the time of reception.

In other words, the bandwidth between the video server and the video client may be determined by using information readily available to the video client, i.e. the size and the time of reception of the received video packets. The available bandwidth may be thus determined simply and efficiently without the need for modification of the video stream in any way. This makes the method universally applicable to a wide variety of streaming protocols such as High Efficiency Streaming Protocol, HESP, low latency Dynamic Adaptive Streaming over HTTP, LL-DASH, low latency HTTP live streaming, LL-HLS.

Further, as the bandwidth may be determined based on information of two consecutive video packets, the rate at which available bandwidth may be derived is as high as the rate of the reception of the video packets. For example, for a live video stream, the bandwidth may be estimated at the rate at which the video packets, i.e. video frames, are streamed by the video server. High-resolution bandwidth estimation is thus obtained which enables the video client to perform an intelligent control of the video playback by selecting the best video stream to be played back at the rate of reception of the video packets.

According to example embodiments, the determining comprises deriving a ratio between the calculated difference in size and the calculated difference in the time of reception subtracted by the time interval between the video packets.

Two parameters are thus calculated; one representing the difference in the size of the video packets and the other the difference in the time of arrival of the video packets. By simply taking the ratio between these two parameters the bandwidth of the communication network between the video server and the video client is thus determined.

According to example embodiments, the determining is performed for every received video packet and with respect to a previously received video packet, thereby obtaining bandwidth samples as a function in time.

By determining the bandwidth for every received video packet with respect to a previously received video packet, for example, the preceding video packet, bandwidth samples at the rate of the received video packets are obtained. This allows obtaining the evolution of the bandwidth over time with high resolution.

According to example embodiments, the determining the bandwidth for every received video packet further comprises taking into account the previously determined bandwidth samples in a weighted manner.

By taking into account the bandwidth samples of previously received packets in a weighted manner, a more accurate calculation is achieved. Further, this allows accounting for the varying degrees of importance of the previously determined bandwidth samples. For example, the more recent bandwidth samples may be given a higher weight than less recent ones.

According to example embodiments, the method further comprises predicting the bandwidth for upcoming video packets based on the bandwidth samples.

By predicting the bandwidth for upcoming video packets, the selection of the subsequent video packets to be transmitted by video server may be controlled optimally such that a stall or a lag in the playback of the video stream on the client device is avoided. For example, if the predicted bandwidth is lower than what it is currently available, the video client may request from the video server video packets with a lower resolution until the available bandwidth is sufficient to play the video at the original video resolution. Alternatively, the video client may request video packets encoded with a different codec or a lower frame rate to avoid stalling of the video during playback. Likewise, when the predicted bandwidth is higher than the bitrate of the currently played video packets, the video client may request from the video server video packets with a higher resolution thereby offering a better user experience to the viewer.

According to example embodiments, the prediction may be performed by employing different prediction approaches. According to example embodiments, the prediction comprises fitting a parametrizable function to the bandwidth samples and predicting the bandwidth for upcoming video packets by extrapolating the fitted parametrizable function.

By fitting a parametrizable function to the bandwidth samples modeling of the evolution of the bandwidth over time is enabled which in turn allows predicting the bandwidth for upcoming video packets. The prediction of the bandwidth for the upcoming video packet may be easily performed by extrapolating the fitted parametrizable function.

According to example embodiments, the parametrizable function is selected from a set of predetermined parametrizable functions, and, wherein the set of predetermined parametrizable functions comprise at least one of a linear function, a triangle-wave function, a block-wave, and a trapezoid-wave function.

By fitting different parametrizable functions to the bandwidth samples the evolution of the bandwidth may be modeled accurately. A simpler bandwidth evolution, such as a periodic linear increase followed by a linear decrease of the bandwidth may be model by fitting linear functions with a positive and negative slope or by fitting a tringle-wave function, while a more complex bandwidth evolution may be modeled by fitting, for example, a trapezoid-wave function or a sinusoidal function.

According to example embodiments, the prediction further comprises re-fitting the parametrizable function by taking into account newly determined bandwidth samples.

By re-fitting the parametrizable function a more accurate prediction is obtained. The fitting of the parametrizable function may be performed as soon as there are newly determined bandwidth samples, i.e. every time a new bandwidth sample is determined, or once a number of new bandwidth samples become available. Preferably, the re-fitting is performed when a new bandwidth sample becomes available.

According to other example embodiments, the predicting comprises a probabilistic prediction. In other words, the bandwidth may be predicted by means of a probabilistic prediction.

By using a probabilistic prediction, video client is provided with additional information, such as the expected bandwidth for a given time interval. The video client may thus utilize this information to decide on the subsequent video packets to be transmitted by the video server. For example, based on the expected bandwidth, the video client may select the video packets with the highest possible bitrate to be transmitted by the video server which the video client may play without stalls.

According to further example embodiments, the predicting may comprise deriving a minimally available bandwidth, $BW_{MIN}$, within an upcoming time interval based on statistical information derived from the bandwidth samples.

By employing mathematical statistics, a variety of statistical information may be easily obtained from the derived bandwidth samples. For example, a minimum available bandwidth over the complete set of bandwidth samples or a minimum available bandwidth within the time window comprising the latest bandwidth samples may be obtained. By deriving the lowest bandwidth within an upcoming time interval, the worst-case scenario within an upcoming time interval may be predicted. This allows the video client to take into account the worst-case scenario when selecting the subsequent video packets to be transmitted by the video server. For example, considering the expected minimally available bandwidth, the video client may request for the upcoming time interval video packets with a lower resolution to allow playback of the video stream without stalls. Further statistical metrics, such as the minimum available bandwidths within a plurality of time windows, the frequency of occurrence of sudden and temporary bandwidth drops or the periodicity in bandwidth jumps from one bandwidth level to another may be obtained. This allows obtaining a variety of statistical information for an upcoming time interval.

According to example embodiments, the predicting is based on a subset of the bandwidth samples, the subset comprising the latest bandwidth samples within a selected time interval.

By using a subset of the latest bandwidth samples, the prediction may be performed in a fast and efficient manner. The time interval may be selected such that the most recent bandwidth samples are taken into account. By doing so the precision of the prediction is not impaired as the most recent bandwidth samples which reflect most accurately the bandwidth evolution are taken into account. The time interval may be adjusted according to the required precision and/or computation efficiency. Further, a weight coefficient may be attributed to the bandwidth samples which allows accounting for the varying degrees of bandwidth samples' importance.

According to example embodiments, the method further comprises requesting a transmission of a group of contiguous video frames from the video server, thereby ensuring the reception of video packets comprising a group of contiguous video frames at predetermined time intervals.

By requesting transmission of a group of continuous video frames, the periodic transmission of contiguous video frames at a line rate is enabled. This allows for determining the bandwidth even in the case when the video packets from the video server are not sent periodically or in the case when the video packet is chopped when transmitted over the communication network.

According to example embodiments, the method further comprises selecting the subsequent video packets to be transmitted based on the predicted bandwidth.

By estimating or predicting the bandwidth, the video client gains knowledge of the available bandwidth for upcoming video packets. By employing this knowledge the video client may take measures to adjust the video playback promptly so that stalling or lagging of the playback is avoided. Further, by employing bandwidth prediction gradual adjustment of the video playback may be performed. For example, the video client may gradually lower or increase the video resolution and/or gradually lower or increase the bitrate of the video. As a result, the viewer experience is optimally exploiting the available bandwidth.

According to example embodiments, the video packet comprises a video segment comprising at least one video frame or a group of contiguous video frames.

The bandwidth estimation may be applied to video packets comprising a video segment which may comprise a video frame or a group of contiguous video frames. This makes the bandwidth estimation method suitable for a variety of streaming protocols. For example, the bandwidth estimation may be applied to adaptive bitrate streaming protocols are MPEG-DASH published as ISO/IEC 23009-1:2012, HTTP Dynamic Streaming by Adobe, HTTP Live Streaming, HLS, by Apple and Smooth Streaming, a Microsoft IIS Media Services extension.

According to a second example aspect, a computer program product is disclosed comprising computer-executable instructions for causing a video client to perform at least the following:
  receiving video packets from a video server wherein the video packets are transmitted by the video server at predetermined time intervals;
  calculating a difference in a size of the video packets and a difference in a time of reception of the video packets; and
  estimating the bandwidth based on the calculated difference in size and the calculated difference in the time of reception.

According to a third example aspect a video client is disclosed comprising at least one processor and at least one memory including computer program code, the at least one memory and computer program code configured to, with the at least one processor, cause the video client to perform:
  receiving video packets from a video server wherein the video packets are transmitted by the video server at predetermined time intervals;
  calculating a difference in a size of the video packets and a difference in a time of reception of the video packets; and
  estimating the bandwidth based on the calculated difference in size and the calculated difference in the time of reception.

The advantages of the first example aspect apply to the second and third examples aspects. Furthermore, the various example embodiments of the first example aspect may be applied as example embodiments to the second and third example aspects.

BRIEF DESCRIPTION OF THE DRAWINGS

Some example embodiments will now be described with reference to the accompanying drawings, wherein:

FIG. 7C shows an example of transitioning back from a periodic transmission of a group of video packets to a periodic transmission of individual video packets and their playout by the video client according to example embodiments of the present disclosure.

DETAILED DESCRIPTION OF EMBODIMENT(S)

Figure 1A:
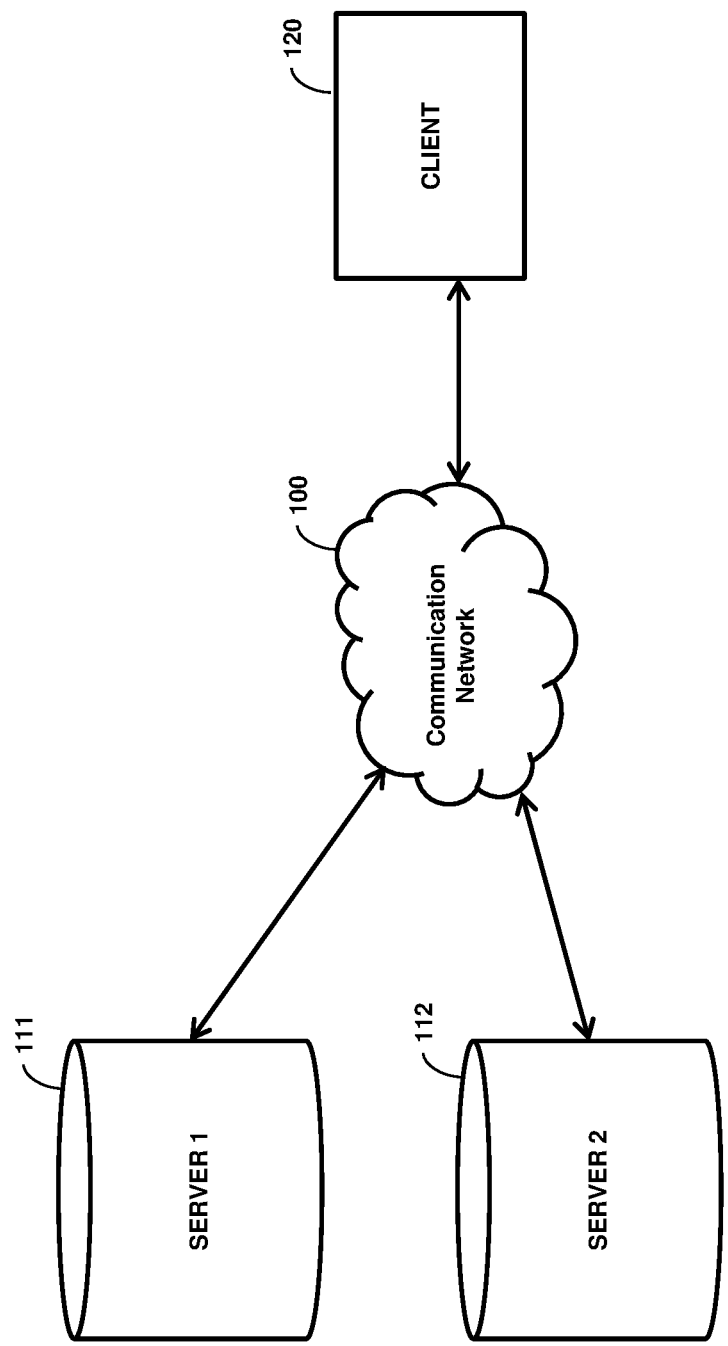
FIG. 1A shows a video server and a video client according to the present disclosure.

Video streaming from a remote video server over a communication network to a video client, such as a video player running in a browser application on a client device is subject to bandwidth variations. Bandwidth variations lead to a stall or a lag in the playback of the video on the client device. For example, the video playback may stall if the buffering of the video content on the client device is too slow. Likewise, if the available bandwidth is not optimally used, the quality of the displayed video is lower than technically possible.

Video content may be streamed live or on demand. In both cases, the video client requests a video stream from the video server over the communication network, such as a Wide Area Network, WAN, or a Local Area Network, LAN.

In the case of live streaming, the video server is typically the server where the video content is created, while in the case of streaming video on demand, the video server may be the origin server or a cache server of a content distribution network where the video content is cached or stored. To cope with bandwidth variations, video clients employ adaptive bitrate solutions in which the video client switches between different bit rates, resolutions or codecs depending on the available bandwidth. This is achieved by providing on the video server different versions of the video stream, each with a different bit rate, resolution or codec. Examples of a video compression specification or standard are H.265/MPEG-H HEVC, H.264/MPEG-25 4 AVC, H.263/MPEG-4 Part 2, H.262/MPEG-2, SMPTE 421M (VC-1), AOMedia Video 1 (AV1) and VP9. According to those standards, the video is compressed in size by using spatial image compression and temporal motion compensation. The video server compresses the individual video frames using different codecs to create different video streams which allow the video client to switch between the different video streams as needed.

According to one streaming technology, the different video streams are segmented into chunks or segments with a chunk or segment comprising a plurality of video frames, typically in the order of seconds. The video chunks are then packetized into video packets and streamed by the video server to the video client over the communication network. This allows the video client to switch between the different versions as needed depending on the available bandwidth. In the case of video on demand, the video segments comprise a number of video frames that may be played independently from one another, thereby allowing the video client to switch between the different versions, i.e. to request differently compressed video segments, as needed depending on the available bandwidth. In the case of live video streaming, the video segments comprise a single video frame. That is, as soon as a video frame is available, the video server compresses, packetizes and sends the video frame over the communication network. Herein, the switch is performed by starting the downloading of chucks or segments from different versions.

Another available streaming technology is disclosed in EP3515075 wherein the different video streams are not further divided into independently playable chunks or segments. Instead, the streams are made available in an independent version and one or more dependent versions. The independent version then provides a stream of temporal independent frames, i.e. frames that are decodable independently from each other. A certain dependent version then provides a compressed stream according to a certain version with a certain bit rate and can have any type of frames. Upon playback, a video client playing the stream then first retrieves by a first independent request a first video packet from the independent version to build up the image in the video player and then retrieves the subsequent frames by a single dependent request from an available dependent version. Switching to another bitrate can be done at any given moment by first requesting a video packet from an independent version having the other bitrate and then requesting a continuous sequence of video packets from a dependent version having the other bitrate.

The present disclosure thus relates to determining the available bandwidth of the communication network between a video server streaming a video to a video client over a communication network. The described various embodiments can be applied to video packets received by any of the streaming technologies described above.

FIG. 1A illustrates streaming video servers 111 and 112 which stream a video over the communication network 100 to a video client 120 on a request from the video client. In this example, the video server 111 may stream live video content while the video server 112 may stream a video on demand content. In either case, the video received by the video client is a sequence of decoded or decompressed video frames. The video client is thus a video application capable of decoding and playing back the video frames one after another. An example of a video client is a video player running in a browser application on a client device, such as a desktop or laptop computer, tablet, smartphone, TV or the like.

Figure 1B:
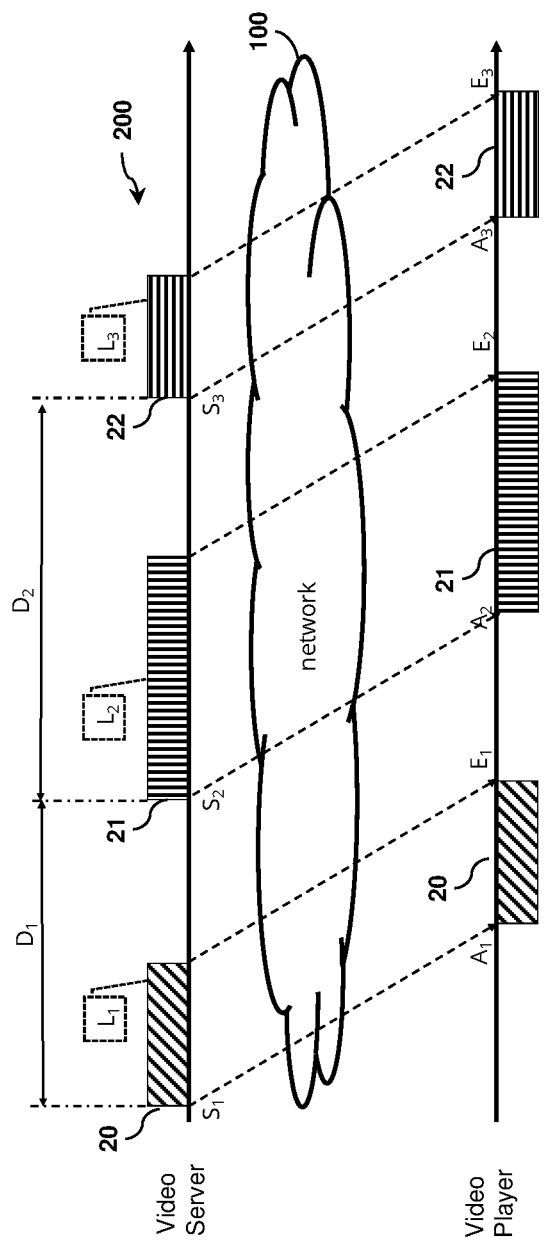
FIG. 1B shows an example of video packets sent periodically from a video server to a video client over a communication network.

An example of a live video stream 200 streamed by the video server 111 which comprises a sequence of compressed video packets 20, 21 and 22 are shown in FIG. 1B. Each of the video packets comprises a video frame with a size $L_1$, $L_2$, and $L_3$, respectively. The video packets are streamed by the video server 111 as soon as a new video frame becomes available on the video server. That is, once available, the video frame is compressed, packetized and then sent to the video client 120 over the communication network 100. The video packets are thus sent at predetermined time intervals $D_1$ and $D_2$ which are defined by the video frame rate. More, in particular, the video packet 20 sent by the video server at start time $S_1$ arrives at the video client 120 at a time of arrival $A_1$ and is received at a time of reception $E_1$. After a predetermined time interval $D_1$, e.g. after 30 milliseconds, the video server 111 sends a subsequent video frame 21, i.e. at a start time $S_2$, which arrives at the video client 120 at a time of arrival $A_2$ and is received at a time of reception $E_2$. After another 30 milliseconds time interval, i.e. $D_2$, a third video packet 22 is sent at a start time $S_3$ which arrives at the video client at a time of arrival $A_3$ and is received at a time of reception $E_3$, and so on until the whole video content is streamed.

The difference between the start time and the time of arrival represents the delay with which the video client receives the video packets from the video server. The delay depends on the propagation delay between the server and the client which is typically represented as half the Round Trip Time, RTT—a measure for indicating a propagation delay between two endpoints. However, as the instantaneous bandwidth of the communication network varies, the propagation delay and therefore the value of RTT will vary as well. The bandwidth variations are also reflected in the amount of time needed for the video client to receive a video packet. Thus, the amount of time between the time of arrival and the time of reception of a video packet will also vary in accordance with the bandwidth variations.

Following the above observations, the time of reception $E_1$ of the first video frame 20 may be calculated as a sum of the time of arrival $A_1$ and the time needed to received the video packet which depends on the size of the video packet $L_1$ and the bandwidth of the communication channel $B_1$. By representing, the time of arrival $A_1$ as a sum of the start time of transmission $S_1$ of the video packet by the video server and the propagation delay between the video server and the video client, i.e. $RTT_1/2$, the time of reception $E_1$ of the first video frame 20 may be represented as follows:

$$E_1 = A_1 + L_1/B_1 = S_1 + RTT_1/2 + L_1/B_1. \tag{1}$$

Likewise, the time of reception $E_2$ of the second video frame 21 may be calculated as:

$$E_2 = A_2 + L_2/B_2 = S_2 + RTT_2/2 + L_2/B_2, \tag{2}$$

wherein $S_2$ indicates the start time of transmission of the video frame by the video server, $L_2$ the size of the video frame, and, $RTT_2/2$ and $B_2$ the instantaneous propagation delay and bandwidth between the server and the client, respectively.

Thus, although the video packets are sent by the video server at predefined time intervals, i.e. $D_1$ and $D_2$, they will be received by the video client at time intervals which vary with the bandwidth variations. In other words, the variations in the time interval between the time of reception of the video packets, i.e. $\Delta E = E_2 - E_1$, reflect the bandwidth variations.

The present disclosure thus proposes to exploit the relation between the difference in the time of reception to estimate the bandwidth of the communication network between the video server and the video client.

As the time interval between the start time of transmission of the video packets, is known by the video client, it follows that difference in the time of reception of the video packets $\Delta E$ may be represented as the sum of the difference in the time of arrival of the video packets and the difference in the time needed to received the video packets as follows:

$$\Delta E = E_2 - E_1 = (A_2 - A_1) + (L_2/B_2 - L_1/B_1) \quad (3.1)$$

which may be represented as $$\Delta E = (S_2 + RTT_2/2 - S_1 + RTT_1/2) + (L_2/B_2 - L_1/B_1) \quad (3.2)$$

and finally as $$\Delta E = D_1 + (RTT_2 - RTT_1)/2 + (L_2/B_2 - L_1/B_1) \quad (3.3)$$

As the average conditions of the communication network do not often change over a very small time interval such as a few image frames at 30 frames per second, it safe to presume that instantaneous bandwidth $B_1$ and $B_2$ over the time interval $D_1$ remain the same, i.e. $B_1 = B_2$. Consequently, the round trip times are also the same, i.e. $RTT_2 = RTT_1$.

From the above, it follows that difference in time of reception between video packets $\Delta E = E_2 - E_1$ may be represented as a sum of the time interval between the video packets, i.e. $D_1$, and the ratio between the size difference of the video packets and the bandwidth, i.e.

$$\Delta E = E_2 - E_1 = D_1 + (L_2 - L_1)/B_1 \quad (4)$$

and that the bandwidth may be determined as:

$$B_1 = (L_2 - L_1)/((E_2 - E_1) - D_1) \quad (5)$$

This relation can be generalized as:

$$B_i = (L_{i+1} - L_i)/((E_{i+1} - E_i) - D_i) \quad (6)$$

wherein the available bandwidth may be determined as a ratio between the size difference of the video packets, i.e. $\Delta L_i = L_{i+1} - L_i$, and the difference in the time of reception, i.e. $\Delta E_i = E_{i+1} - E_i$, subtracted by the time interval $D_i$ between the video packets.

The bandwidth calculation is thus based on the assumption that the video packets have different but known by the video client sizes and that the bandwidth of the communication network changes negligibly within the time interval between the video packets.

The video client has knowledge of the size of the video packets, L, and the time interval between the video packets, D. This information is typically obtained from the received packets and the manifest file which is appended at the beginning of the video stream. Thus, by utilizing the above information and by recording the time of reception E of the video packets, the video client can determine the instantaneous bandwidth B of the communication network. In other words, the bandwidth of the communication network between the video server and the video client may be calculated based on the difference in the time of reception of the video packets $\Delta E_i$ and their sizes $\Delta L_i$.

Figure 2:
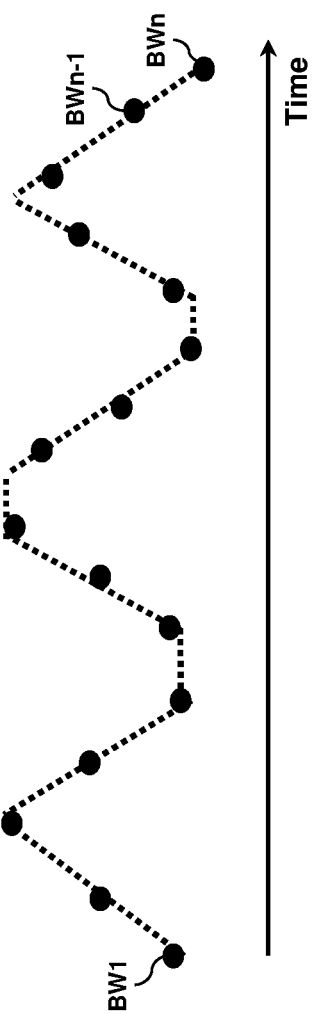
FIG. 2 shows an example of bandwidth samples estimated using the method according to example embodiments of the present disclosure.

Calculating the bandwidth for several video packets allows obtaining samples of the bandwidth over time. FIG. 2 shows an example of bandwidth samples BW1 to BWn with a bandwidth sample BW1 estimated based on the first pair of successive video packets and a bandwidth sample BWn estimated based on an n-th pair of successive video packets. Linear increase and decrease, as well as steady behaviour of the bandwidth, is observed.

The resolution of the derived time evolution of the bandwidth, as in FIG. 2, depends on the video packets taken into account in the calculation of the bandwidth and therefore on the time interval between them. For example, if bandwidth samples are calculated for every pair of successive video packets, a bandwidth evolution over time with a resolution corresponding to the rate of transmission of the video packets is obtained. If, however, the bandwidth samples are calculated based on every even or odd number of video packets, a bandwidth evolution with a resolution half the rate of transmission of the video packets is obtained.

To increase the robustness with which the bandwidth is calculated, bandwidth samples of previously received video packets may be taken into account in a weighted manner. For example, the bandwidth for the n-th video packet, $\overline{B}_n$, may be calculated as weighted arithmetic mean value in which the previously estimated bandwidth samples are weighted by a weight coefficient a as follow:

$$\overline{B}_n = \Sigma_{i=n}^0 \alpha_{n-i} \cdot B_i, \quad (7)$$

wherein the $\overline{B}_n$ is the bandwidth for the last received, i.e. the n-th, video packet, $\alpha_{n-i}$ is the weight factor attributed to the respective bandwidth samples and $B_i$ is the bandwidth samples for the respective i-th video packet.

As the bandwidth of the communication network between the video server and the video client varies over time, the most recent sample would reflect the available bandwidth most correctly. Therefore, the most recent bandwidth samples may be attributed to the highest weight factor than the rest. For example, the weight factor attributed to the bandwidth samples may increase exponentially with a weight factor of 1 attributed the last, i.e. most recent, bandwidth sample.

According to a further embodiment, the bandwidth time evolution may be modeled by fitting one or more parametrizable function to the bandwidth samples. Parametrized functions such as linear, triangular, trapezoid, sinusoidal or the like may be used.

FIG. 3A shows an example of a sinusoidal function F1 fitted to the bandwidth samples BW1 to BWn. The sinusoidal function may be extrapolated as shown in FIG. 3B to show the evolution of the bandwidth for upcoming video packets, i.e. video packets to be received. The extrapolation of the fitted parametrized function allows predicting the available bandwidth for the upcoming video packets. In this example, the predicted value of the next five upcoming bandwidth samples, i.e. BWp1 to BWp5, is illustrated.

To further improve the prediction, the fitting of the parametrized function may be refined by taking into account the latest bandwidth estimations. For example, the function may be refitted every time a new bandwidth sample becomes available. Alternatively, the refitting may be performed once a number of new bandwidth samples become available which allows limiting the amount of computation needed to be performed by the video client.

The computation complexity and, therefore, the time needed to model the bandwidth evolution may be further limited, by fitting the sinusoidal function to the bandwidth samples within a selected time interval. For example, the concept of a sliding window may be applied. According to this concept, the sinusoidal function may be fitted to a time interval comprising the latest samples. The prediction precision may be controlled by varying the size of the sliding window and, therefore, the number of the bandwidth samples taken into account. The size of the sliding window should be such that bandwidth variations are observable with a sufficient accuracy. In other words, a narrow sliding window may be used when the variations in the bandwidth occur with a higher frequency. For example, the sliding window may be size to comprise the last five or ten bandwidth samples. Vice versa, a wide sliding window may be used when the variations occur with a lower frequency. Logically, the more bandwidth samples used the higher the computation load. Thus there is a trade-off observed between the size of the sliding window and computation load.

Figure 4:
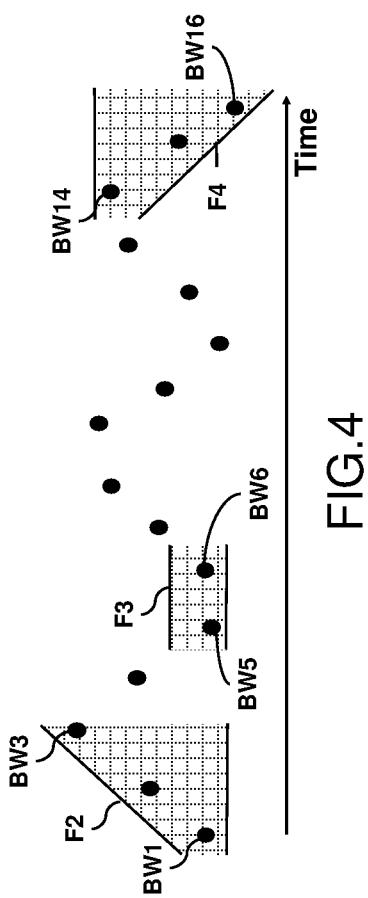
FIG. 4 shows an example of a combination of parameterized functions fitted to the bandwidth samples of FIG. 2 according to example embodiments of the present disclosure.

Another example is shown in FIG. 4 where a set of linear functions is fitted to the bandwidth samples to model the bandwidth evolution over time. To correctly model bandwidth evolution, the respective linear functions are fitted to recent subsets of the bandwidth samples. As shown in the figure, an increase in the bandwidth may be modeled by fitting a linear function with a positive slope, F2, to a subset of the bandwidth samples, e.g. samples BW1 to BW3, while a decrease in the bandwidth may be modeled by fitting a linear function with a negative slope, F4. Further, a linear function with a zero slope, F3, may be fitted to another subset of the bandwidth samples, e.g. BW5 and BW6, to model steady over time bandwidth.

Figure 3:
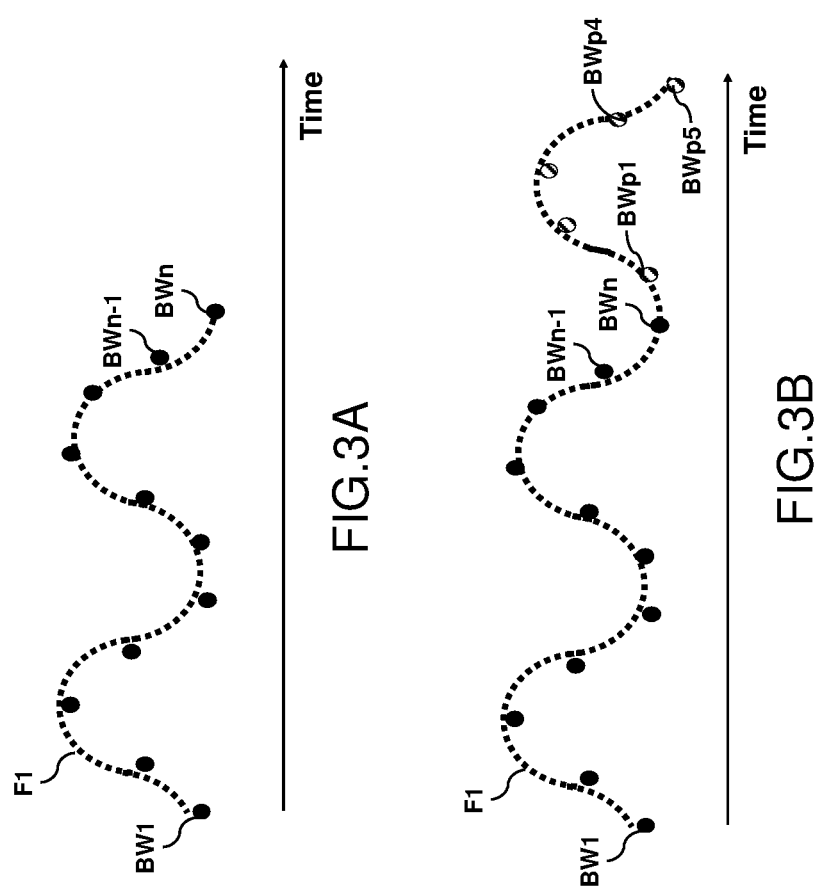
FIG. 3A shows an example of a parameterized function fitted to the bandwidth samples of FIG. 2 according to example embodiments of the present disclosure.
FIG. 3B shows an example of bandwidth samples predicted based on the fitted parametrized function according to example embodiments of the present disclosure.

Similarly to the example of FIG. 3, to reduce the computational load on the video client, the fitting of the set of parameterized function may be performed for a subset of bandwidth samples within a selected time window. Again the sliding window approach may be applied which in this case allows extracting the rate with which the bandwidth varies within the time window. That is, depending on the slope of the linear function, e.g. if the slope is has a positive slope of 0.5, then an increase of bandwidth with a rate of 100% is observed. Alternatively, if the slope is zero, i.e. bandwidth remains steady, then the rate of change of the bandwidth is also zero.

Figure 5:
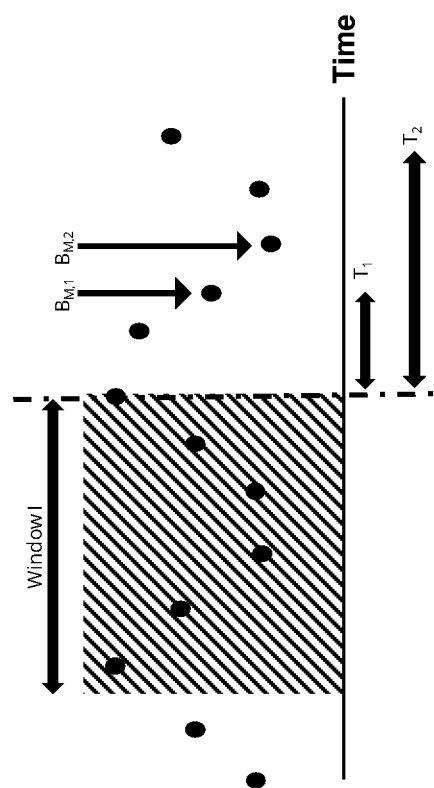
FIG. 5 shows an example of bandwidth prediction according to example embodiments of the present disclosure.

FIG. 5 shows another example embodiment in which bandwidth is predicted by means of probabilistic prediction. Probabilistic methods estimate the probability with which an event is to occur. An event may be, for example, the probability with which the bandwidth for an upcoming time interval will fall within a specific range or the probability with which the bandwidth may have a minimum available value. The higher the probability of an event, the more likely it is that the event will occur. Probabilistic methods incorporate random variables and probability distributions, such as histograms to model the event. In the present example, a probabilistic prediction is used to predict the bandwidth within an upcoming time period, i.e. $T_1$ or $T_2$, based on all bandwidth samples. Based on the observed bandwidth samples, a variety of statistical information may be obtained. For example, the maximum or the minimum available bandwidth ever observed, the minimum and maximum bandwidth per time interval, the bandwidth distribution, the bandwidth distribution per time intervals as well as the percentage of bandwidth samples observed within a certain bandwidth range or the percentage of the minimum available bandwidth within the ranges may be observed. Further, statistical information on the duration of a periodic increase or decrease of the bandwidth from one bandwidth level to another may be also observed. Such information give an indication on the probability that the current bandwidth level will remain valid in the future, i.e. within an upcoming time interval. Further, statistical information on sudden and temporary drops may also be obtained. Such information may be used to predict the frequency of occurrence of as well as the duration of the bandwidth drops. By exploiting the statistical information, prediction of the bandwidth for the upcoming video packets may be obtained.

In the example of FIG. 5, the prediction is based on the sliding window concept where the most recent bandwidth samples within a time interval, Window I, are taken into account. Herein, the minimum available bandwidth within the upcoming time interval $T_1$ and $T_2$ is predicted, by observing the minimum available bandwidth within a sliding window over the past bandwidth samples. A minimum available bandwidth for a respective sliding windows is thus recorded. Based on this information, a rate of occurrence of the observed minimum available bandwidths is calculated, which reflects the probability with which the bandwidth within the upcoming time intervals $T_1$ and $T_2$ would have a certain minimum value.

The size of the sliding window should be selected such that bandwidth variations are observable within the sliding window with sufficient accuracy. That is, a narrow sliding window may be used when the variations in the bandwidth occur with a higher frequency and vice versa. A trade-off is thus observed between the prediction precision and computation load. In addition to the size of the sliding window, the computation complexity is further defined by the selected probabilistic model and the type of the statistical metric to be observed. In other words, the wider the time window i.e. the more bandwidth samples used, the more complex the probabilistic model and/or the more complex statistical metrics observed, the higher the computation complexity.

Predicting the bandwidth for the upcoming video packets allows the video client to select promptly the type of the subsequent video packets to be transmitted by the video server. As described above, if a significant bandwidth drop is predicted in the next 1 second, the video client might request video packets with lower bitrate until the bandwidth increases to allow again video playback at higher bitrates. Likewise, if the bandwidth increases significantly, the video client may request video packets with a higher bitrate so that the available bandwidth is optimally used. As the prediction is performed in a timely manner, stall or lags in the video playback are avoided.

In some scenarios, however, for example, in the case when the video packets are not sent periodically, or, in the case when the video packets with size known by the video client, have been, for some reason, split by the communication network, the equation (6) does not be applied.

In such scenarios, instead of sending the video frame by frame at framerate with the potential risk of not being possible to receive contiguous video packet ranges of known size at line speed, the video may be sent as a segment by segment at line speed. Such video segments may be created as described in detail below.

Figure 6:
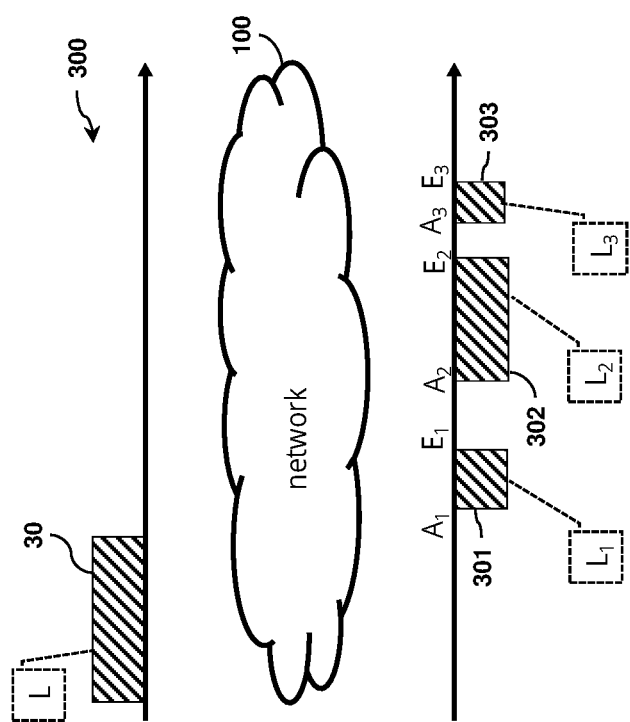
FIG. 6 shows another example of video packets sent periodically from a video server to a video client over a communication network.

FIG. 6 shows the scenario where a video packet is split over the communication network into a number of smaller video packets. In this example, the video packet 30 of size L is chopped into three packets 301, 301 and 303 with sizes L1, L2, and L3, respectively. Although the total size L of the three packets 301, 302 and 303 is known, the derivation of the bandwidth is not possible, because there are idle periods in between the reception hence falsifying the results.

Figure 7A:
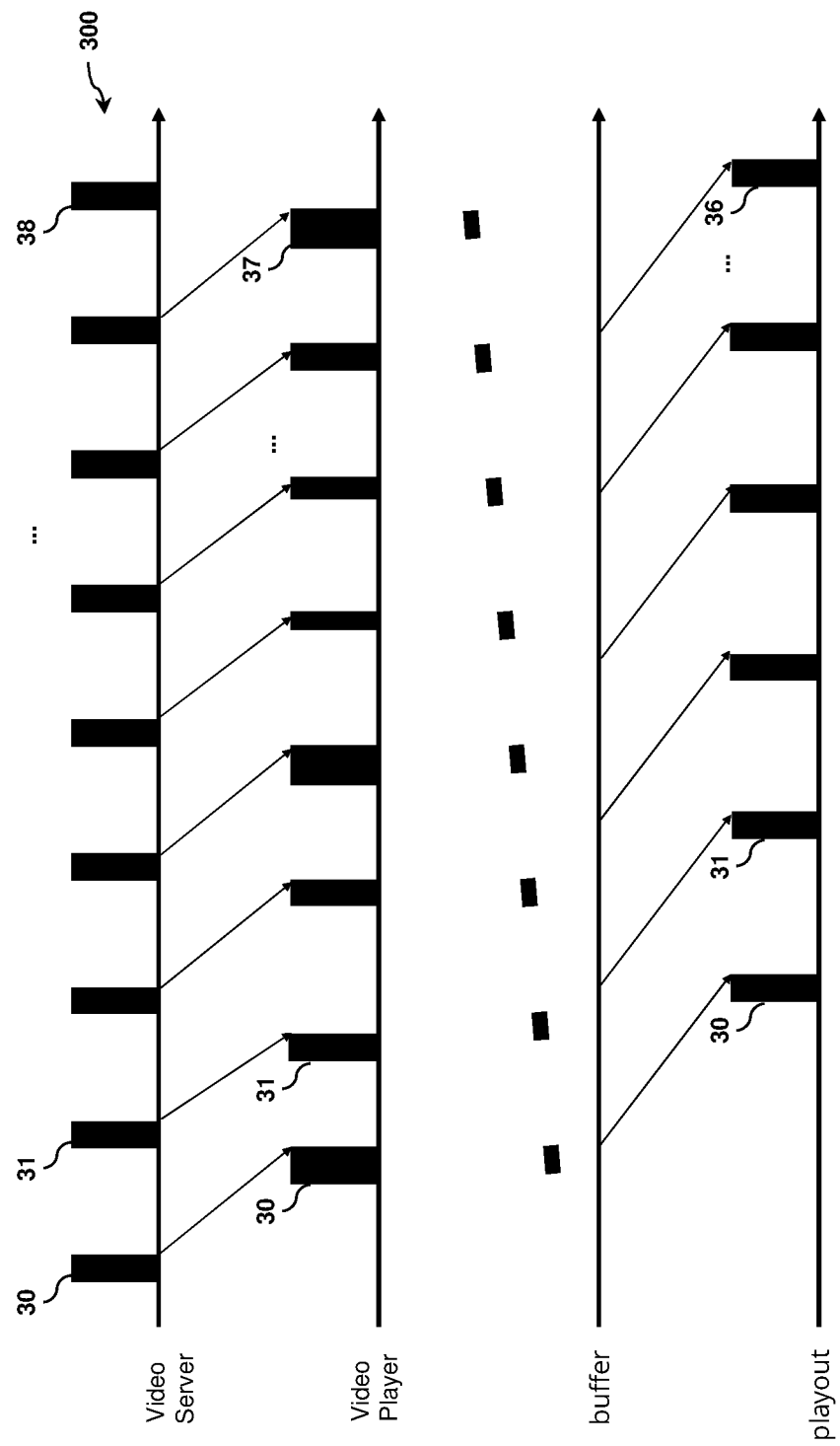
FIG. 7A shows an example of video packets sent periodically over a communication network and their playout by the video client according to example embodiments of the present disclosure.
Figure 7B:
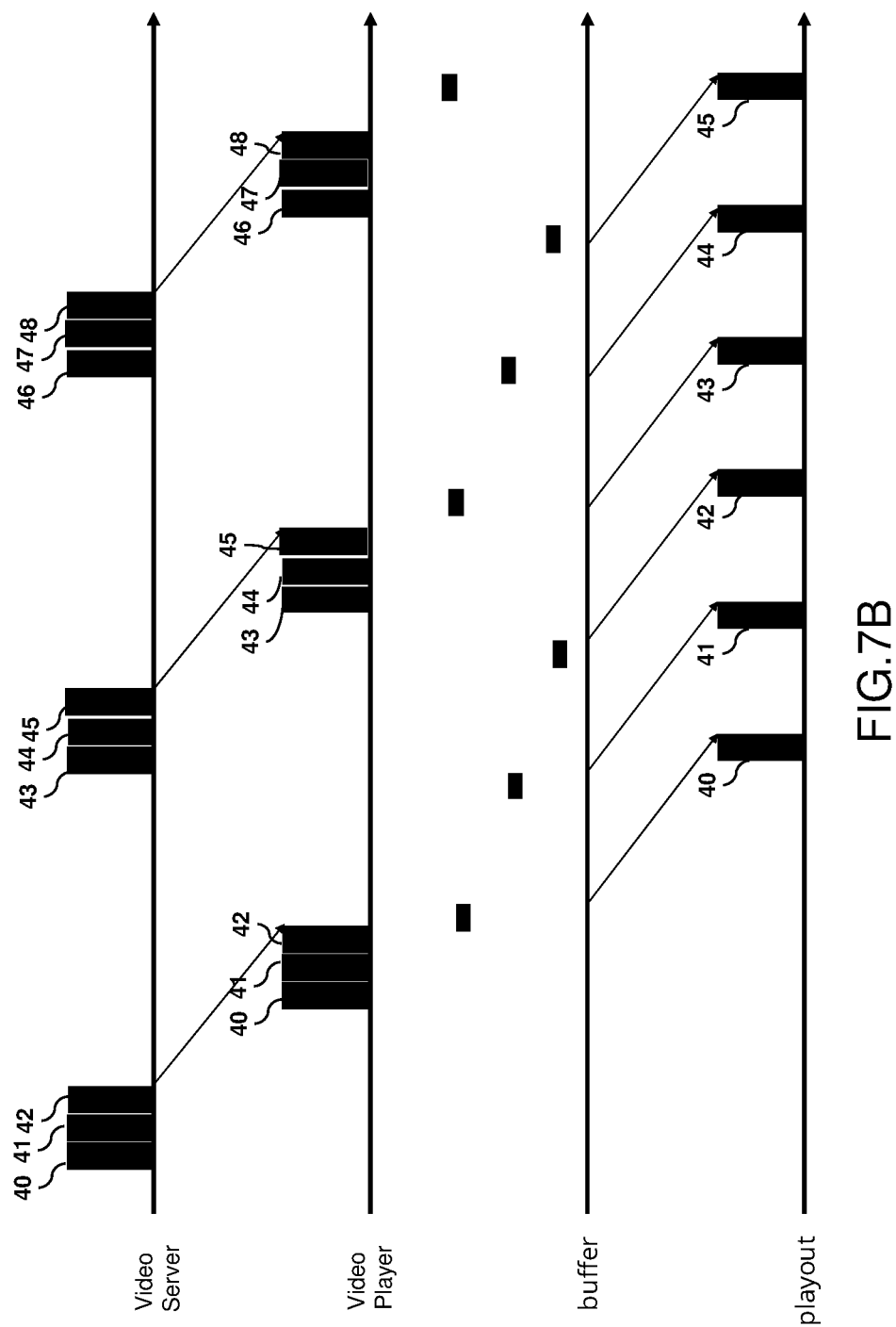
FIG. 7B shows an example of a group of video packets sent periodically over a communication network and their playout by the video client according to example embodiments of the present disclosure.

To overcome these issues, a transfer of contiguous packet ranges at line speed needs to be enforced. That is, instead of the video client requesting live images always upon availability, i.e. at framerate, the video frames are requested at a slower pace so that a group of video frames may be sent together in a single video packet by the video server at line speed. This can be achieved by allowing buffering of the video frames in the video client and then pausing the request for frames until a contiguous group of video frames becomes available on the video server, as shown in FIG. 7A. To avoid stall of the video playback, the buffered video frames 30, . . . ,38 are played out at slower, but unperceived by the user, frame rate. Once a group of video frames, in this example three video frames 40, . . . ,42, becomes available at the video server, the video client requests their transfer. As the video frames are now available at the video server they maybe send together as a group of contiguous video frames at line speed over the communication network, as shown in FIG. 7B. The request is again paused until another group of video frames 43, . . . ,45 becomes available. The video frames 40, . . . 42 and 43, . . . 45, and so on may now be played at a normal frame rate. This results in a periodic transfer of a group of contiguous video frames which allows for applying the above-described method for determining the bandwidth between the video server and the client. Once sufficient bandwidth samples are derived, the transfer of video frame may transition back to requesting live images as in FIG. 7A as shown in FIG. 7C. That is, the video client starts requesting video frames as soon as they become available on the video server. The enforced periodic transfer may be maintained for as long as it is required by the selected bandwidth calculation and/or prediction precision. For example, if the fitting of a trapezoid function requires n bandwidth samples, then it is required to maintain the enforced perioding traffic until n+1 transfers of contiguous video frames have been sent before transition back to requesting live images at the video framerate. The video client may again enforce the periodic transfer of a group of contiguous video frames if, for example, a prediction refinement is to be performed.

In a third scenario, when the video packets comprise a plurality of video frames, for example, in the case of a video on demand streamed using the segmented streaming technology, the video packets may be too large to allow for an accurate bandwidth measurement, i.e. in the case when variations in the bandwidth over the communication network are observed within the period of reception of subsequent video packets. In such a scenario, it would be advisable to split the video stream into smaller segments.

The embodiments of the present disclosure have been described by referring to video packets. It should be understood that the video packets may comprise video segments comprising a plurality of video frames as according to the chunked or segmented streaming technology, and, it should be further understood that the video packets may comprise one video frame or a group of contiguous video frames as according to the streaming technology described in EP3515075.

Further, although the embodiments of the present disclosure have been described by referring to video stream, it should be understood that the present disclosure may be applied to any media stream, including but not limited to audio and metadata such as subtitles. Thus, the media content may comprise one or more audio tracks and one or more metadata tracks.

Figure 8:
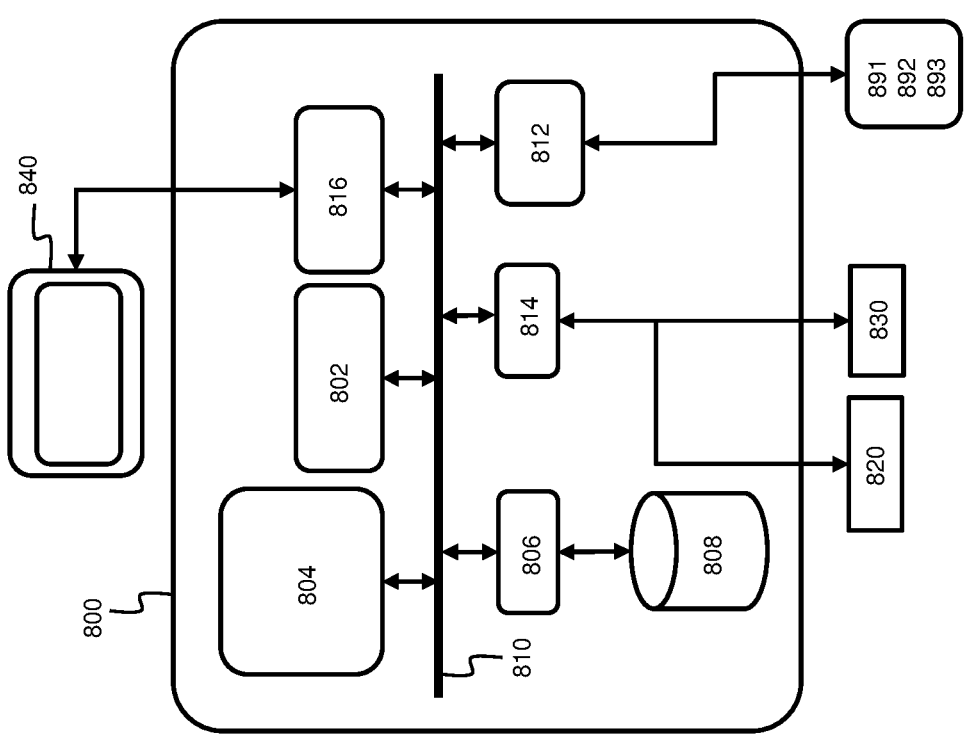
FIG. 8 shows an example embodiment of a suitable computing system for performing one or several steps in embodiments of the invention.

FIG. 8 shows a suitable computing system 800 enabling to implement embodiments of the method for estimating bandwidth between a video server and a video client according to the invention. Computing system 800 may, in general, be formed as a suitable general-purpose computer and comprise a bus 810, a processor 802, a local memory 804, one or more optional input interfaces 814, one or more optional output interfaces 816, a communication interface 812, a storage element interface 806, and one or more storage elements 808. Bus 810 may comprise one or more conductors that permit communication among the components of the computing system 800. Processor 802 may include any type of conventional processor or microprocessor that interprets and executes programming instructions. Local memory 804 may include a random-access memory, RAM, or another type of dynamic storage device that stores information and instructions for execution by processor 802 and/or a read-only memory, ROM, or another type of static storage device that stores static information and instructions for use by processor 802. Input interface 814 may comprise one or more conventional mechanisms that permit an operator or user to input information to the computing device 800, such as for example a keyboard 820, a mouse 830, a pen, voice recognition and/or biometric mechanisms, a camera, etc. Output interface 816 may comprise one or more conventional mechanisms that output information to the operator or user, such as a display 840, etc. Communication interface 812 may comprise any transceiver-like mechanism such as one or more Ethernet interfaces that enables computing system 800 to communicate with other devices and/or systems, for example with other computing devices 891, 892, 893. The communication interface 812 of computing system 800 may be connected to such another computing system by means of a local area network, LAN, or a wide area network, WAN, such as for example the internet. Storage element interface 806 may comprise a storage interface such as for example a Serial Advanced Technology Attachment, SATA, interface or a Small Computer System Interface, SCSI, for connecting bus 810 to one or more storage elements 808, such as one or more local disks, for example, SATA disk drives, and control the reading and writing of data to and/or from these storage elements 808. Although the storage element(s) 808 above is/are described as a local disk, in general, any other suitable computer-readable media such as a removable magnetic disk, optical storage media such as a CD or DVD, -ROM disk, solid-state drives, flash memory cards, . . . could be used. Computing system 800 could thus correspond to the video client according to the various embodiments of the present disclosure.

As used in this application, the term "circuitry" may refer to one or more or all of the following:
  (a) hardware-only circuit implementations such as implementations in only analog and/or digital circuitry and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and/or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for determining bandwidth between a video server and a video client for playing back a video stream comprising video packets, the method comprising the following steps performed by the video client:
   receiving the video packets from the video server wherein the video packets are transmitted by the video server at predetermined time intervals;
   calculating a difference in a size of the video packets and a difference in a time of reception of the video packets;
   determining the bandwidth based on the calculated difference in size and the calculated difference in the time of reception and the predetermined time intervals between the video packets,
      wherein the determining is performed for every received video packet and with respect to a previously received video packet, thereby obtaining bandwidth samples as a function in time; and
   predicting the bandwidth for upcoming video packets based on the bandwidth samples,
      wherein the predicting comprises fitting a parametrizable function to the bandwidth samples and predicting the bandwidth for upcoming video packets by extrapolating the fitted parametrizable function.

2. The method for determining bandwidth according to claim 1, wherein the determining the bandwidth for every received video packet further comprises taking into account previously determined bandwidth samples in a weighted manner.

3. The method for determining bandwidth according to claim 1, wherein the parametrizable function is selected from a set of predetermined parametrizable functions, and,
   wherein the set of predetermined parametrizable functions comprise at least one of a linear function, a triangle-wave function, a block-wave, and a trapezoid-wave function.

4. The method for determining bandwidth according to claim 1, further comprising re-fitting the parametrizable function by taking into account newly determined bandwidth samples.

5. The method for determining bandwidth according to claim 1, wherein the predicting the bandwidth for upcoming video packets is by means of a probabilistic prediction.

6. The method for determining bandwidth according to claim 5, wherein the predicting comprises deriving a minimally available bandwidth, BWMIN, within an upcoming time interval based on statistical information derived from the bandwidth samples.

7. The method for determining bandwidth according to claim 1, wherein the predicting is based on a subset of the bandwidth samples, the subset comprising the latest bandwidth samples within a selected time interval.

8. The method for determining bandwidth according to claim 1, further comprises requesting a transmission of a group of contiguous video frames from the video server, thereby ensuring reception of video packets comprising a group of contiguous video frames at predetermined time intervals.

9. The method for determining bandwidth according to claim 1, wherein the video packet comprises a video segment comprising at least one video frame.

10. The method for determining bandwidth according to claim 1, further comprising selecting subsequent video packets to be transmitted based on the predicted bandwidth.

11. The method for determining bandwidth according to claim 1, wherein the video packet comprises a video segment comprising a group of contiguous video frames.

12. A non-transitory computer-readable media having computer-executable instructions stored thereon, which, when executed by one or more processors of a video player, cause the video player to perform at least the following:
   receiving video packets from a video server wherein the video packets are transmitted by the video server at predetermined time intervals;
   calculating a difference in a size of the video packets and a difference in a time of reception of the video packets;
   determining the bandwidth based on the calculated difference in size and the calculated difference in the time of reception and the predetermined time intervals between the video packets,
      wherein the determining is performed for every received video packet and with respect to a previously received video packet, thereby obtaining bandwidth samples as a function in time; and
   predicting the bandwidth for upcoming video packets based on the bandwidth samples,
      wherein the predicting comprises fitting a parametrizable function to the bandwidth samples and predicting the bandwidth for upcoming video packets by extrapolating the fitted parametrizable function.

13. A video client comprising at least one processor and at least one memory including computer program code, the at least one memory and computer program code configured to, with the at least one processor, cause the video client to perform:
  receiving video packets from a video server wherein the video packets are transmitted by the video server at predetermined time intervals;
  calculating a difference in a size of the video packets and a difference in a time of reception of the video packets;
  determining the bandwidth based on the calculated difference in size and the calculated difference in the time of reception and the predetermined time intervals between the video packets,
    wherein the determining is performed for every received video packet and with respect to a previously received video packet, thereby obtaining bandwidth samples as a function in time; and
  predicting the bandwidth for upcoming video packets based on the bandwidth samples,
    wherein the predicting comprises fitting a parametrizable function to the bandwidth samples and predicting the bandwidth for upcoming video packets by extrapolating the fitted parametrizable function.

* * * * *